Figure 1:
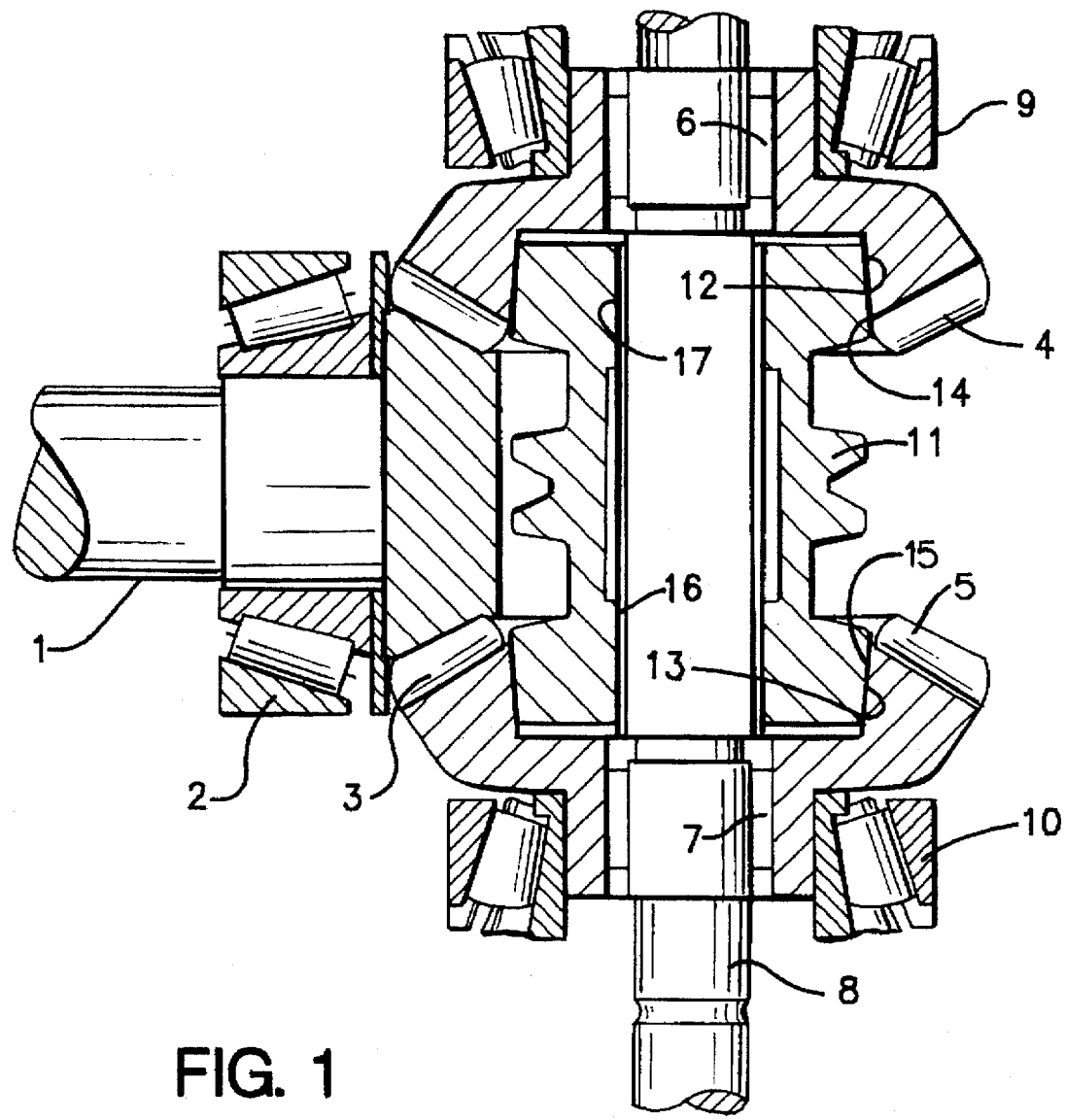

United States Patent
Hallenstvedt et al.

[11] Patent Number: 5,690,521
[45] Date of Patent: Nov. 25, 1997

[54] TRANSMISSION DEVICE, ESPECIALLY A REVERSING GEAR FOR BOATS

[75] Inventors: Oddbjörn Hallenstvedt, Köping; Bo Kristiansson, Kungsör, both of Sweden

[73] Assignee: AB Volvo Penta, Gothenburg, Sweden

[21] Appl. No.: 670,633

[22] Filed: Jun. 26, 1996

[30] Foreign Application Priority Data

Jun. 26, 1995 [SE] Sweden .................. 9502302

[51] Int. Cl.$^6$ .................. B63H 20/14
[52] U.S. Cl. .................. 440/75; 192/107 M
[58] Field of Search .................. 440/75; 192/107 R, 192/107 M

[56] References Cited

U.S. PATENT DOCUMENTS 4,679,681  7/1987  Creydt et al. .................. 192/107 M
4,944,378  7/1990  Christian .................. 192/107 M
5,076,410  12/1991  Maycock et al. .................. 192/107 R

FOREIGN PATENT DOCUMENTS 2 314 348  9/1974  Germany .
  501 269  12/1994  Sweden .
2 133 094  7/1984  United Kingdom .

Primary Examiner—Jesus D. Sotelo
Attorney, Agent, or Firm—Young & Thompson

[57] ABSTRACT

Reversing gears for boats, comprising an angle gearing with two gears (4,5) rotatably mounted on a secondary shaft (8) and alternately lockable to the shaft by means of a clutch sleeve (11). The clutch sleeve consists of aluminum and has exterior coupling cones with surfaces (12,13), which are oxidized and impregnated with a fluoroplastic and are heat-treated. The rotatably mounted gears (4,5) have interior coupling cones (14,15) of tempered steel.

2 Claims, 1 Drawing Sheet

TRANSMISSION DEVICE, ESPECIALLY A REVERSING GEAR FOR BOATS

The present invention relates to a transmission device, especially a reversing gear for a marine engine, comprising a first shaft with a first gear non-rotatably fixed to said shaft, a second shaft mounted perpendicular to the first shaft with two second gears freely rotatably mounted on said second shaft, said second gears engaging the first gear and each having an individual interior conical frictional surface, and, between said second gears, a clutch sleeve axially displaceably mounted on the second shaft and having two exterior conical frictional surfaces which face away from each other and which each cooperate with an individual one of said interior frictional surfaces to alternately lock the second gears to the second shaft.

Transmission devices of this type are available in a number of different variants of reversing gear mechanisms for boats, both in traditional inboard installations and in outboard drive units, e.g. of the Aquamatic®-type. SE-A-417075 shows and describes for example a reversing gear mechanism of the type described by way of introduction and which is included in a basic transmission which, together with a number of different attachments, forms a modular system.

Such transmissions must be able to withstand repeated shifting without slippage or binding. This places great demands on the selection of materials and on maintaining small tolerances.

One design which has been used during recent years and which has proved to fulfill the requirements concerning operational reliability and long life and high shifting quality, has a clutch sleeve and clutch tings of tempered steel which are joined to the rotating gears. The interior frictional surfaces of the clutch rings have been coated with a wear layer of molybdenum. All of the frictional surfaces have been ground with great precision to achieve high surface smoothness, which is necessary to achieve the desired function. This has, among other things, meant that one was first forced to apply a relatively thick layer of molybdenum, of which approximately two thirds was ground off in the grinding operation. Molybdenum is an expensive material and the grinding process used is relatively complicated and this made the reversing mechanism, which is in principle rather simple, relatively expensive to manufacture.

The purpose of the present invention is to achieve a transmission device of the type described by way of introduction, which is particularly intended for engines rated up to approximately 200 HP and which can be manufactured at lower cost than the described known transmission device but which nevertheless has at least as high torque transmission capacity, operational reliability and length of life as said device at the same time as the shitting quality is higher.

This is achieved according to the invention by virtue of the fact that the shifting sleeve has exterior conical frictional surfaces of aluminum, which are oxidized and impregnated with a fluoroplastic and are heat-treated.

In a preferred embodiment the clutch sleeve is made in its entirety of aluminum and its surface layer is untreated, which results in low manufacturing cost, since aluminum is an inexpensive material which is easy to work and the need for after-treatment of the surface layer has been eliminated by achieving a smooth layering. It has been demonstrated that a softer engagement and disengagement can be achieved by the design according to the invention than with the previously known design without noting any slipping tendencies.

By providing the frictional surfaces of the clutch sleeve, for example with a wear layer consisting of aluminum oxide, which has been impregnated and surface-coated with a fluoroplastic layer and then been heat-treated, a number of important characteristics are obtained in a transmission device described by way of introduction. Thus, high hardness and good wear resistance is obtained, and this results in low wear and thus minimal soiling of the transmission oil, and this increases the total life of the transmission. The low tendency to clash prevents clashing during emergency and hard shifting. A low coefficient of friction and good release properties provide, in combination with low weight of the clutch sleeve, easy engagement and disengagement of the gear.

The invention will be described in more detail below with reference to examples shown in the accompanying drawing, which shows a longitudinal section through a transmission device according to the invention.

The transmission shown in the figure shows an input shaft which is mounted in a roller bearing 2 in a housing (not shown in more detail here). The bevel gear 3 is non-rotatably fixed in the shaft 1 and engages two bevel gears 4,5, which are mounted in needle bearings 6,7 on a secondary shaft 8. The gears 4,5 are also mounted in roller beatings 9,10 in the housing (not shown), which can be the housing to a reversing gear for a purely inboard engine installation or a portion of an outboard drive unit. In both cases, the secondary shaft drives one or two (concentric) propeller shafts via an angle gearing.

On the secondary shaft 8, a clutch sleeve 11 is displaceably mounted, and has exterior conical frictional surfaces 12,13, which upon axial displacement of the sleeve 11 by means of shifting means (not shown in more detail here) can be brought into engagement with interior conical frictional surfaces 14,15 on the gears 4,5 for non-rotatable coupling of the gears 4 or 5 to the secondary shaft 8. The clutch sleeve 11 is provided in a known manner with an internal screw thread 16, which engages a corresponding external screw thread 17 on the secondary shaft 8, so that turning the sleeve on the shaft results in axial displacement of the sleeve 11. The screw thread is directed so as to reinforce the engaging force between the cooperating frictional surfaces 12,14 and 13,15.

The clutch sleeve 11 consists of aluminum. Its conical frictional surfaces 12,13 are oxidized by means of a carefully controlled oxidation process and the aluminum layer is impregnated with a fluoroplastic. By a subsequent heat treatment, an extremely strong bond is created between the oxide and the plastic, and a coating is obtained which is hard, has good wear resistance and low friction as well as good release properties. Coatings of this type are available in other contexts on the market under the trade mark Tufram®. Examples of areas of use are casting dies for plastic products with small draft angles. The frictional surfaces 14,15 of the gears 4,5 are, in the example shown, ground directly in the gears 4,5 themselves, which are manufactured in case-hardened steel, but the frictional surfaces 14,15 can also be worked in separate rings joined to the gears.

We claim:

1. Transmission device, especially a reversing gear for a marine engine, comprising a first shaft with a first gear non-rotatably fixed to said shaft, a second shaft mounted perpendicular to the first shaft with two second gears freely rotatably mounted on said second shaft, said second gears engaging the first gear and each having an individual interior conical frictional surface, and, between said second gears, a clutch sleeve axially displaceably mounted on the second shaft and having two exterior conical frictional surfaces which face away from each other and which each cooperate with an individual one of said interior frictional surfaces to alternately lock the second gears to the second shaft, characterized in that the clutch sleeve (11) has exterior conical frictional surfaces (12,13) of aluminum, which are oxidized and impregnated with a fluoroplastic and are heat-treated.

2. Transmission device according to claim 1, characterized in that the clutch sleeve (11) consists in its entirety of aluminum and that each exterior conical frictional surface (12,13) has an unworked surface coating.

* * * * *